United States Patent
Shoup

(10) Patent No.: US 12,018,197 B2
(45) Date of Patent: *Jun. 25, 2024

(54) METHOD AND APPARATUS FOR PREPARING COIR

(71) Applicant: GENUS INDUSTRIES, LLC, Oregon City, OR (US)

(72) Inventor: David Shoup, Oregon City, OR (US)

(73) Assignee: GENUS INDUSTRIES INC., Oregon City, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,035

(22) Filed: Dec. 9, 2020

(65) Prior Publication Data

US 2021/0087468 A1 Mar. 25, 2021

Related U.S. Application Data

(63) Continuation of application No. 15/648,124, filed on Jul. 12, 2017, now Pat. No. 10,947,453.

(60) Provisional application No. 62/361,303, filed on Jul. 12, 2016.

(51) Int. Cl.
| | |
|---|---|
| *B01J 2/20* | (2006.01) |
| *A01N 61/00* | (2006.01) |
| *B02C 18/14* | (2006.01) |
| *B02C 18/18* | (2006.01) |
| *B29B 9/08* | (2006.01) |
| *C05B 17/02* | (2006.01) |
| *C05G 3/80* | (2020.01) |
| *C09K 17/16* | (2006.01) |
| *C09K 17/32* | (2006.01) |

(52) U.S. Cl.
CPC .............. *C09K 17/32* (2013.01); *A01N 61/00* (2013.01); *B01J 2/20* (2013.01); *B02C 18/14* (2013.01); *B02C 18/142* (2013.01); *B02C 18/182* (2013.01); *C05B 17/02* (2013.01); *C05G 3/80* (2020.02); *C09K 17/16* (2013.01); *B29B 9/08* (2013.01)

(58) Field of Classification Search
CPC ....... B29B 9/08; B02C 18/182; B02C 18/142; B02C 18/14; B02C 18/16; B02C 18/162; B02C 18/18; B02C 18/184; B02C 18/186; C09K 17/32; C09K 17/16; C05B 17/02; B01J 2/20

See application file for complete search history.

(56) References Cited

U.S. PATENT DOCUMENTS

| | | | |
|---|---|---|---|
| 4,032,271 A | | 6/1977 | Gasior |
| 4,538,766 A | * | 9/1985 | Vandenbussche .... B02C 18/182 241/243 |
| 4,565,015 A | | 1/1986 | Hundley, III |
| 4,632,752 A | | 12/1986 | Hunke |
| 4,961,540 A | * | 10/1990 | Wiesemann ........ B02C 18/0092 241/46.06 |
| 5,084,218 A | | 1/1992 | Vos et al. |

(Continued)

FOREIGN PATENT DOCUMENTS

| | | | | |
|---|---|---|---|---|
| DE | 4236121 A1 | * | 4/1994 | ......... B02C 18/0007 |
| DE | 102012204330 B3 | * | 6/2013 | ........... B02C 18/142 |

*Primary Examiner* — Seyed Masoud Malekzadeh
(74) *Attorney, Agent, or Firm* — Miller Nash LLP

(57) ABSTRACT

A method of processing coir, comprising using counter-rotating blades to shred compressed coir into dry, shredded coir.

8 Claims, 7 Drawing Sheets

(56) References Cited

U.S. PATENT DOCUMENTS

| | | | | |
|---|---|---|---|---|
| 5,248,100 | A | * | 9/1993 | Arakawa ............... B02C 18/142 241/34 |
| 5,484,112 | A | * | 1/1996 | Koenig ............... B02C 18/2233 241/285.2 |
| 5,516,050 | A | * | 5/1996 | Yamamoto ........... B02C 18/182 241/236 |
| 5,535,946 | A | * | 7/1996 | Clark .................... B02C 19/186 241/23 |
| 6,092,753 | A | * | 7/2000 | Koenig ............... B02C 18/2233 241/285.2 |
| 6,143,221 | A | | 11/2000 | Gurol |
| 6,270,708 | B1 | * | 8/2001 | Gurol ....................... B29B 9/16 425/222 |
| 6,582,638 | B1 | | 6/2003 | Key |
| 7,587,856 | B2 | * | 9/2009 | Rubin .................. A01G 24/44 47/1.01 R |
| 8,969,435 | B2 | * | 3/2015 | Wright .................... B29C 48/39 524/543 |
| 10,947,453 | B2 | * | 3/2021 | Shoup .................. B02C 18/142 |
| 2001/0054658 | A1 | * | 12/2001 | Nakagomi ........... B02C 18/182 241/295 |
| 2005/0036925 | A1 | * | 2/2005 | Butler .................. B09B 3/0075 422/26 |
| 2005/0218253 | A1 | * | 10/2005 | Hess ..................... B02C 18/142 241/236 |
| 2006/0049291 | A1 | * | 3/2006 | Rajewski ............ B02C 18/0007 241/236 |
| 2006/0219826 | A1 | * | 10/2006 | Yamamoto ........... B02C 18/142 241/236 |
| 2006/0283340 | A1 | * | 12/2006 | Pallmann .............. B30B 11/201 100/117 |
| 2007/0062113 | A1 | * | 3/2007 | Rubin .................... A01G 24/35 47/59 S |
| 2007/0157676 | A1 | | 7/2007 | Taquet et al. |
| 2009/0062427 | A1 | | 3/2009 | Tornow et al. |
| 2010/0176233 | A1 | * | 7/2010 | Rota .................... B02C 18/142 241/189.2 |
| 2011/0062263 | A1 | * | 3/2011 | Bartelt ................. B02C 18/182 241/236 |
| 2011/0109013 | A1 | | 5/2011 | Hashiba |
| 2011/0147504 | A1 | * | 6/2011 | Lipowski ................ B02C 18/14 241/220 |
| 2011/0232173 | A1 | | 9/2011 | Lefebvre |
| 2011/0277384 | A1 | * | 11/2011 | Bertin .................... C05F 5/002 47/58.1 SC |
| 2012/0018555 | A1 | * | 1/2012 | Schiffer ............. B02C 18/2233 241/101.2 |
| 2012/0024996 | A1 | * | 2/2012 | Bongratz ................ B02C 18/24 241/101.5 |
| 2012/0199675 | A1 | | 8/2012 | Kulesa et al. |
| 2012/0208933 | A1 | | 8/2012 | Hamilton et al. |
| 2012/0280419 | A1 | | 11/2012 | Martin et al. |
| 2013/0158164 | A1 | | 6/2013 | Morris et al. |
| 2013/0207295 | A1 | | 8/2013 | Cernohous et al. |
| 2013/0207297 | A1 | | 8/2013 | Cernohous et al. |
| 2014/0048633 | A1 | * | 2/2014 | Thomas .................... B26D 3/22 241/24.26 |
| 2014/0110510 | A1 | * | 4/2014 | Rivir ....................... C01B 32/55 193/31 A |
| 2014/0202847 | A1 | | 7/2014 | Bergstra et al. |
| 2017/0096376 | A1 | | 4/2017 | Farnworth et al. |
| 2017/0129822 | A1 | | 5/2017 | Farnworth et al. |
| 2017/0137333 | A1 | | 5/2017 | Farnworth et al. |
| 2018/0016498 | A1 | | 1/2018 | Shoup |
| 2021/0354147 | A1 | * | 11/2021 | Fornasier ................ B02C 18/14 |

* cited by examiner

METHOD AND APPARATUS FOR PREPARING COIR

CROSS REFERENCE TO RELATED APPLICATION

This application is a continuation of U.S. patent application Ser. No. 15/648,124 filed Jul. 12, 2017, which claims priority to and the benefit of U.S. Provisional Application No. 62/361,303 filed Jul. 12, 2016, which are incorporated herein by reference in their entirety.

BACKGROUND

Coconut coir pith fibre is natural material found in coconut husks, which is located between the outer coat and internal, hard shells. This fibrous material is also referred to as coco peat. Coir has a number of applications, including use in agriculture. One of the properties that makes coir ideal for use in agriculture is the ability to capture and hold large amounts of moisture. Specifically, coir is able to swell to 2.5 or more times its original volume.

Coir is sold in the marketplace in different forms. Typically, coir is available in 5 kg or 20 kg blocks, which are extremely hard to break down. Companies have developed a number of processes to treat the coir to create a useable variety. Such processes include the addition of water, chemicals or other additives. For example, one company forms a soup-like material with the use of water and chemicals, including binders, that make it brittle; roll out the material into sheets; and finally break or crumble the sheets into pieces. This process detracts from many of the desirable properties of coir which existed prior to processing, such as the natural expandability and absorbability of coir.

The market has a need for coir methods and systems, which preserve the natural, advantageous properties of coir. Specifically, the following method uses a dry process without the use of chemicals or additives that preserves the natural properties of coir. The inventor has further developed a formulation of additives to add to coir for use in soil.

DETAILED DESCRIPTION OF THE EMBODIMENTS

Embodiments of the disclosed technology generally include systems and methods for processing coir.

One of the key features of the disclosed inventions is the dry process and the ability to create usable process coir without the use of binders. This disclosed method and system provides a healthy, organic option for the agriculture industry for use with plant nursery and field crops, such as growing grass seed. However, the potential applications of this invention are not limited to the agriculture industry and have many uses, such as for barbeque grilling material, bio fuels, coir for absorbing liquids, odors and waste, coir dust for seed starting pots, coir fibre for making lawn rugs or blankets with incorporated seeds, fibre baskets with coir pith, coir with vegetation seeds incorporated, coir discs with and without nutrients, coir for skin care, coir granular small chips, coir chunks, colored coir and pellets, chips for yard mulch and field crop row topping, coir as animal bedding and litter, coir coated with polymer and seeds, coir made into compressed discs, body fluid waste absorbent (medical), some of which are discussed in more detail below. Further, the inventor has developed an additive formula for the use in soil applications.

Figure 1:
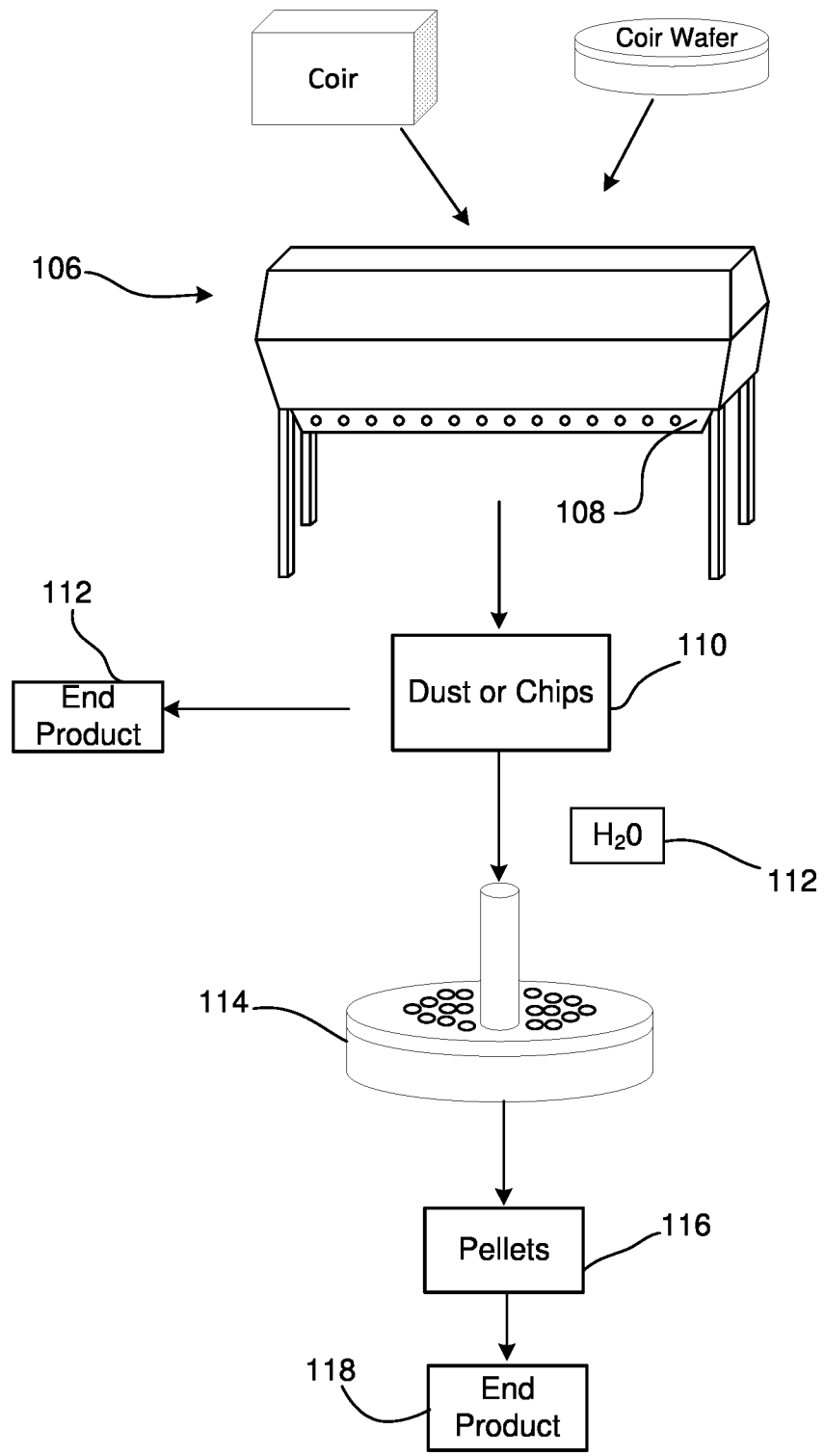
FIG. 1 shows an illustrative embodiment of a flow chart of the system and method for processing coir.

FIG. 1 shows an illustrative method for processing coir. Coir generally comes in 5 kg or 20 kg block as shown at 102, which are nearly impenetrable. Alternatively, coir may be acquired in the form of wafers 104 or husk chips. The original form of the coir will be referred to as the packaged coir. To begin the process, the coir is placed into a machine to break apart the blocks or wafers. The shredder 106, in this embodiment, is rectangular in shape at the top with a funnel at the bottom. The coir in the illustrative embodiment is placed into the top of the shredder 106 and flows vertically through to the funnel. Located at the center of the shredder is a roller or separate blades as described in more detail in FIG. 3.

The product exiting the shredder may be different shapes and sizes, such as loose granular, fine, coarse dust, large or small chips. The desired size may be achieved through a variety of methods, such as selection of different types of machinery, blades, spacing of blades, or the presence of a screen as shown at 108. The optional screen 108 may be placed at the bottom of the funnel to select the appropriate size of material. The screen is exemplarily shown at a honey-combed or hexagonal shaped screen with a knife-like protrusion at one end. With the screen 108, only the desired size is able to exit the shredder. Material that remains too large in size is cyclized back through the shredder until it has reached the appropriate size. The product exiting the shredder may be different shapes and sizes.

Figure 2:
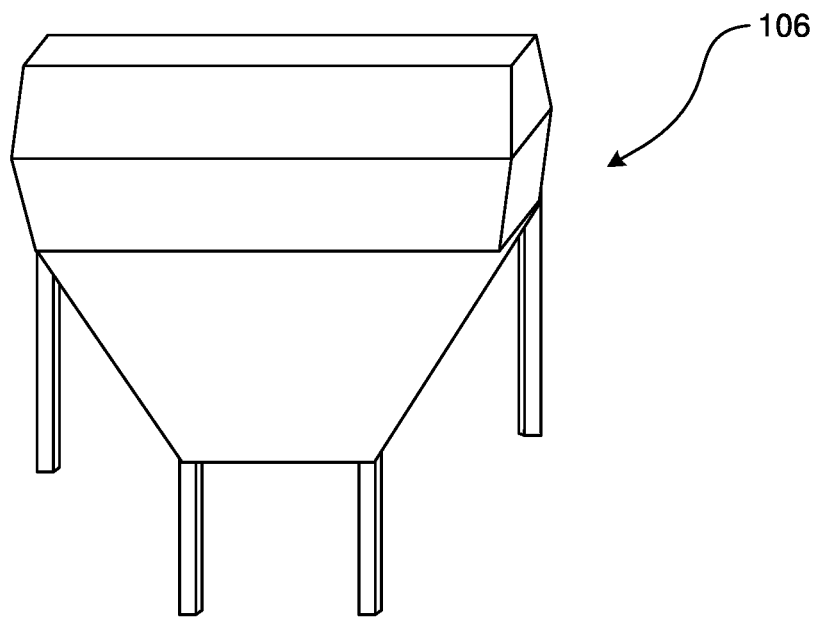
FIG. 2 shows an illustrative embodiment of a shredder system used to process coir.

FIG. 2 shows an illustrative embodiment of the shredder used to process the coir. Many other types of machinery may be used to achieve the same or similar results, such as wood chippers, grinders, recycling devices, and so forth. In other embodiments, the user may desire a completely different end product and in such a case use machinery that will produce the desired material. For example, the coir may be heated to different temperatures and as such would need additional and/or different equipment.

Figure 3:
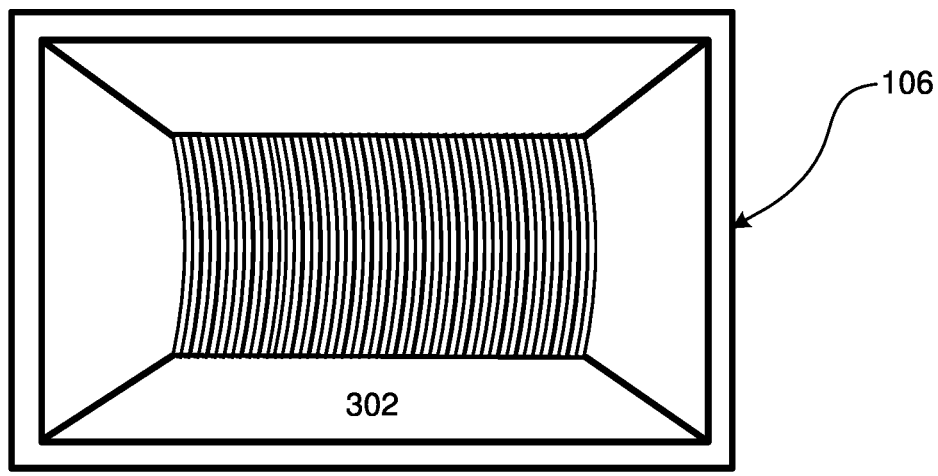
FIG. 3 shows an illustrative embodiment of a top view of the shredder system used to process coir.

FIG. 3 illustrates an overhead view of the embodiment of the shredder which includes blades for processing the coir. The shredder 106 is rectangular in shape with sloping walls towards a trough located in the center. At the center, a collection of counter-rotating blades, which alternate between blades with or without hooks to pull the material into the shredder. The number of blades varies depending on the size of the shredder or the desired degree of desired processing. Optionally located below the blades shown at 302 is a pair of grinder/pinchers which further grind up the coir before exiting the machine.

Figure 4:
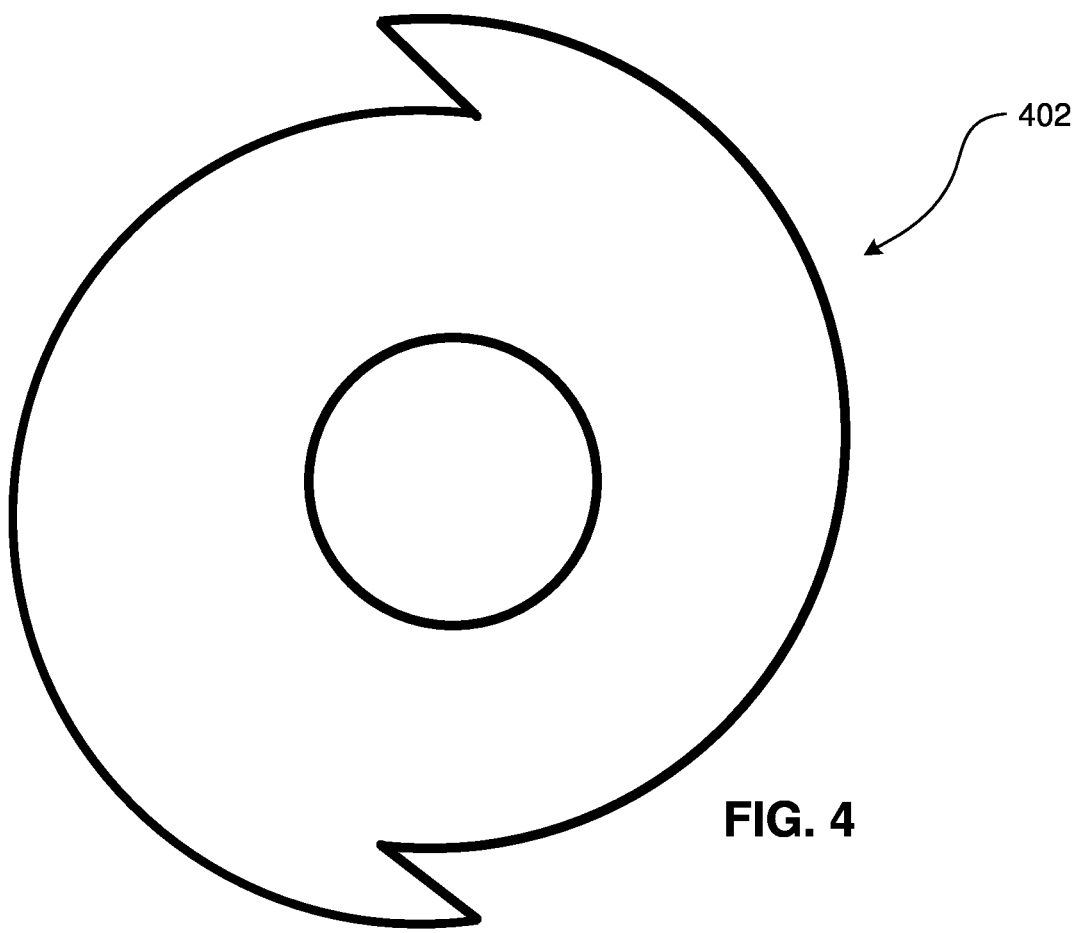
FIG. 4 shows an illustrative embodiment of one of the blades with hooks used in a shredder system.

FIG. 4 shows a blade 402 removed from the center of the shredder. The blade 402 has hooks located at the top and the bottom of the blade to draw in the material into the shredder. Also present in the illustrative blade 402 is a central opening to allow the blade to be placed on a rotating shaft. In alternate embodiments, the blades may be circulated through other means such as a welded shaft to the center plate of the blade. The spacer blades in the shedder lack the hooks shown in the illustrative embodiment and are circular in shape with a center hole for the rotating shaft. The blades may be comprised of a single or combination of materials, such as steel, aluminum, or other materials suitable for cutting coir. The blades' and/or hooks' sizes, shapes, variability, and number may vary for a number of reasons, such as the type of processing required for the coir. In some embodiments, the size of the hooks on the blades are uniform. In other embodiments, the hooks are multiple sizes.

Figure 5:
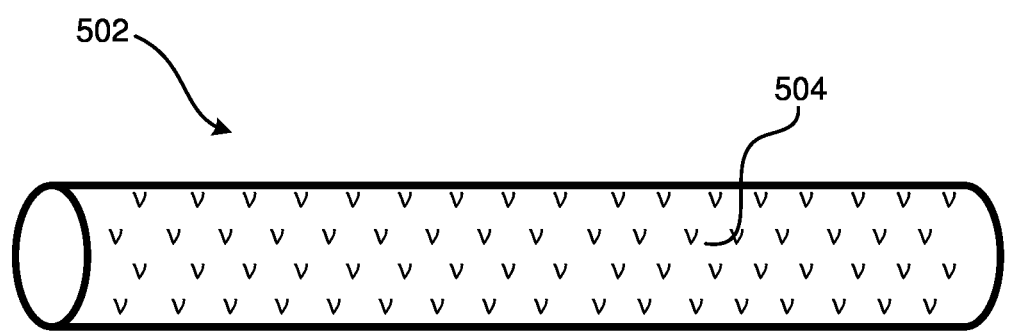
FIG. 5 shows an illustrative alternate embodiment of a roller used in a grinder system to process coir.

FIG. 5 shows alternative equipment for shredding material in the illustrative grinder, specifically a rotary grinder. In this example, a solid cylinder of steel 502 with spikes 504 located on the outside of the cylinder. The spikes 504 may be evenly or randomly placed depending on the desired size, shape and uniformity of the material exiting the grinder.

Figure 6:
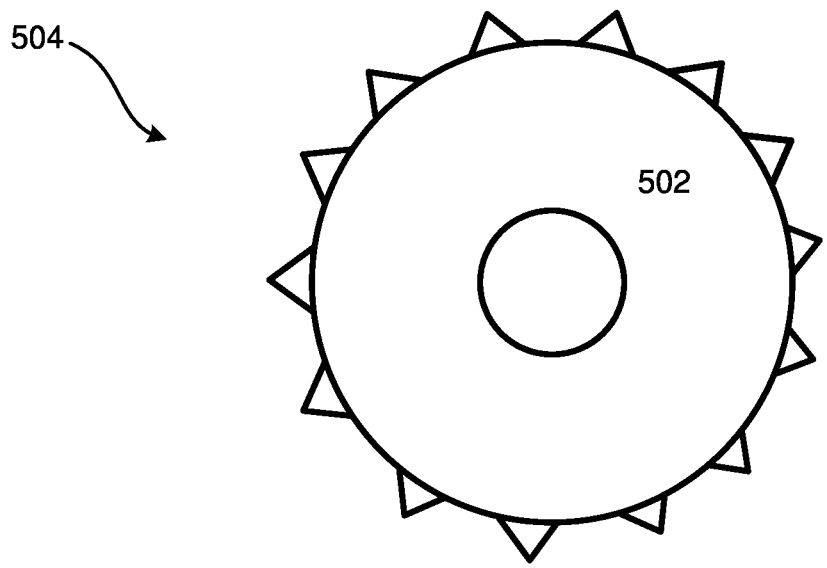
FIG. 6 shows an illustrative embodiment of the end of a roller used in a grinder system to process coir.

FIG. 6 shows an end view of the rotary grinder 502 with the spikes 504 located along the outside of the cylinder. The method for rotating the cylinder may take different forms. In this example, a circular opening is located in the middle for the insertion of a rod.

Figure 7:
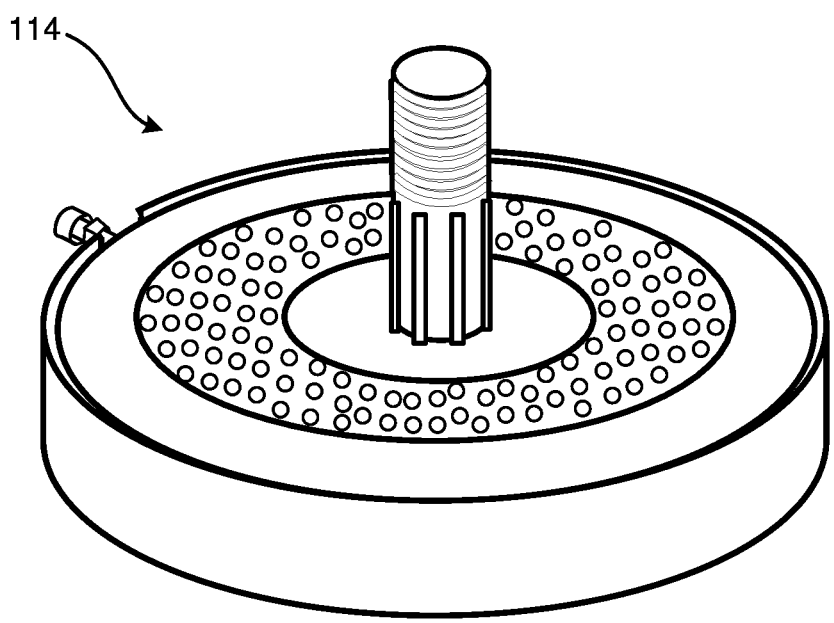
FIG. 7 shows an illustrative embodiment of a mechanism used to create pellets.

FIG. 7 shows an exemplary embodiment of an apparatus for making pellets from coir. The flat metal disk, also referred to as a die, is shown at 114. The illustrative flat, metal disk 114 is circular with a strip of solid metal located on the inner and outer edge of the disk. The outer edge is smooth in nature but in alternative embodiment may comprise a grooved surface. Between the two strips of metal are uniform, circular openings, or holes, which are used to compress the coir material into pellet shapes. The size and number of the holes may vary depending on a number of circumstances, such as the size of the metal disk and the desired pellet size. The metal disk may also vary in thickness due to a variety of reasons, such as the consistency of the coir material to be processed or pellet shape and size.

One of the unique aspects of this particular invention is the shape of the holes in the metal disk 114. Specifically, the holes are flat, cylindrical openings, and some drilled at an angle. Other dies available in the marketplace have tampered or chambered holes. The shape of the die holes is described in more detail below in FIG. 9. Further, no type of binders, additives or other chemicals are used to make pellet shapes from the coir. Therefore, only raw or unamended coir is used to make pellets.

In one embodiment, the coir is broken into coarse and/or fine granular or fine with use of the shredder described above. The processed coir is then hydrated 10% to 18% before being placed in the pellet-making apparatus. Once placed in the apparatus, the material is then compressed through the flat, untapered holes to form soft or hard pellets based on moisture content and temperature.

Figure 8:
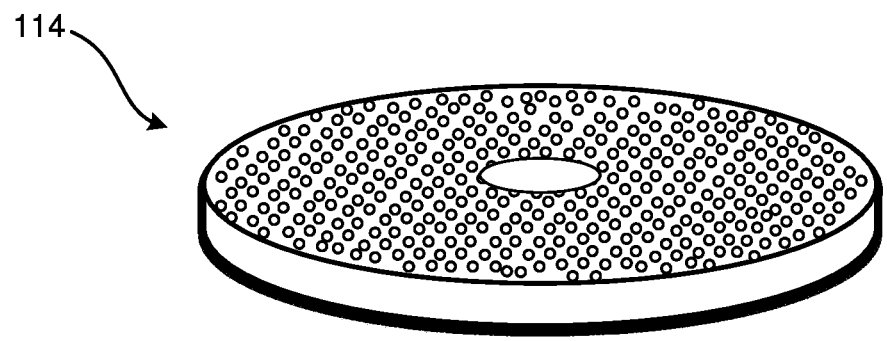
FIG. 8 shows an illustrative embodiment of the die separated from the mechanism to create pellets.

FIG. 8 shows illustrative embodiment of the die 114 separated from the pellet making device. The thickness of the die may vary for a variety of reasons. For example, the thickness of the die may impact the compression of the coir material into the pellet shape. Further, depending on the consistency and water content of coir, different thicknesses may be preferable to achieve the desired rate of compression and shape of pellet.

Figure 9:
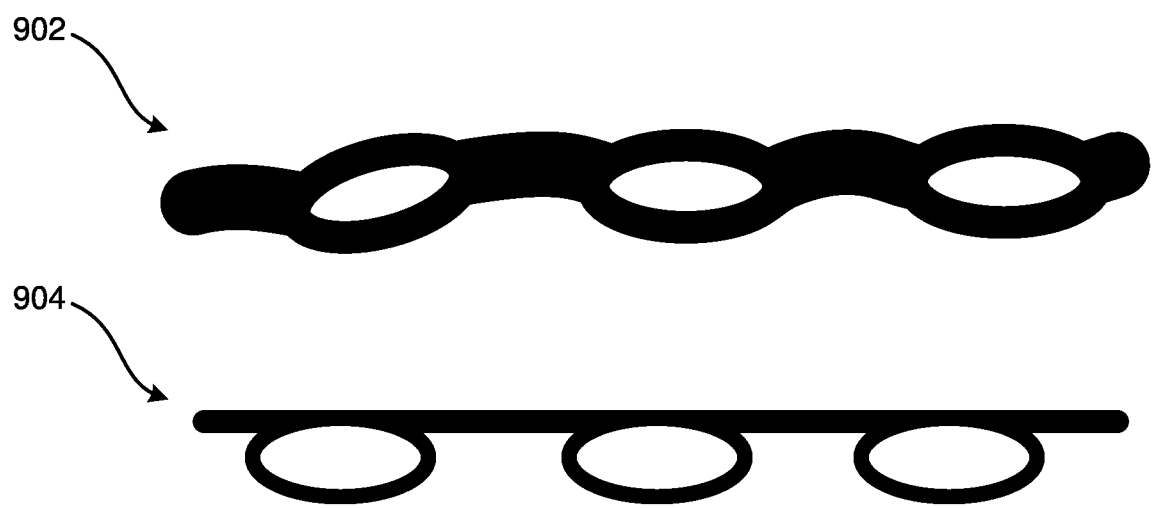
FIG. 9 shows an illustrative embodiment of the hole shape in the die used to create pellets.

FIG. 9 illustrates a close-up view of the openings/holes in the die 114. At 902, in other dies, the holes are tapered or chambered and cause over-compression of the pellets. The inventor has discovered that flat cylindrical openings 904 without any type of tapering or chambering achieves optimal consistency for ease of use, transport, breakability, and expandability.

Figure 10:
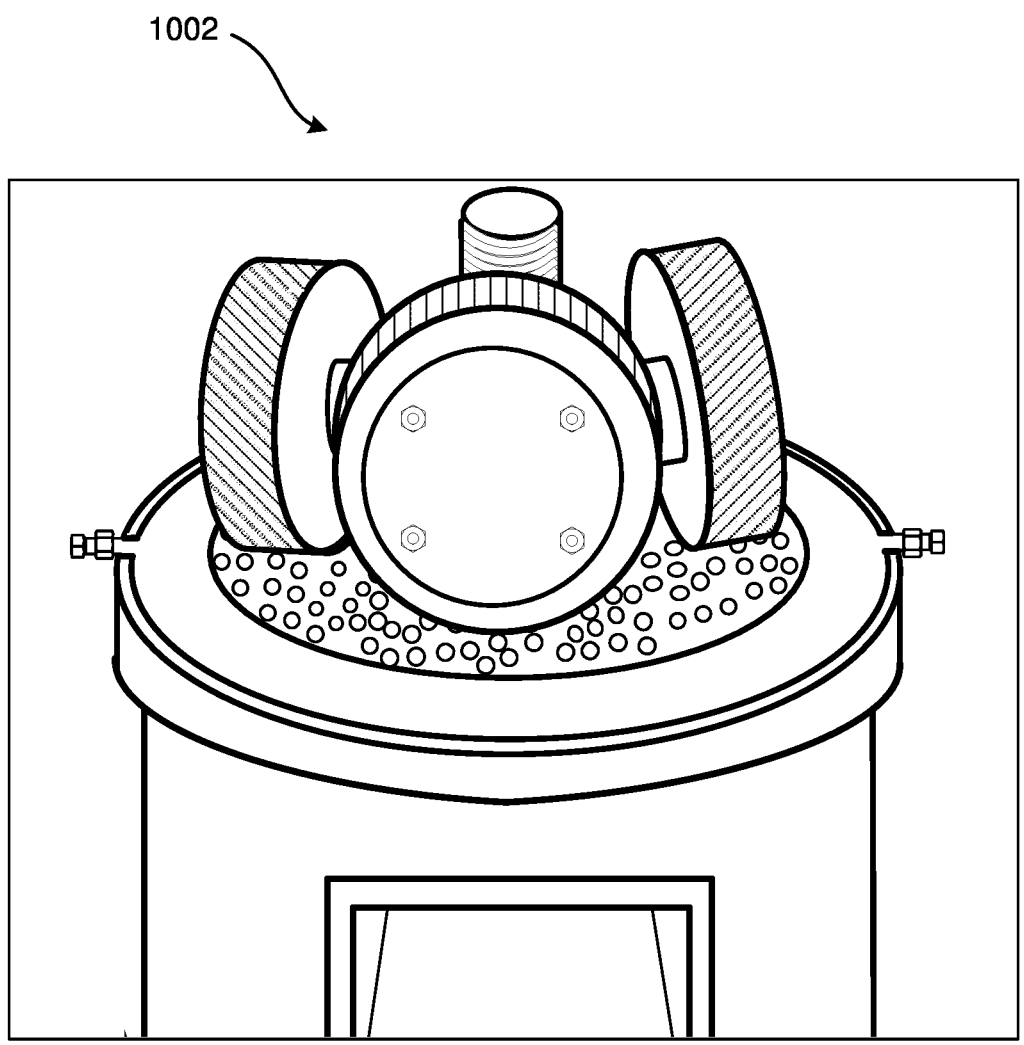
FIG. 10 shows an illustrative embodiment of the mechanism used to create pellets with the rollers attached to the mechanism.

FIG. 10 shows one embodiment of the pellet-making device 1002 with three rotating, grooved wheels placed in the pelletizing apparatus. As noted earlier, the coir granular or fine is hydrated with water to 10% to 15%. The desired water content of the coir granular or fine may be tested through any number of means, including the use a hydrometer. The hydrated coir material is then placed into the top of the device either manually or through other means, such as an automated process. The rotating wheels spin over the top of the die and compress the hydrated coir dust through the holes to form pellets. In other embodiments, the wheels will be stationary and the metal disk will rotate along the widget causing compression of the material through the die. The size and number of the pellets will vary depending on the die used. The pellets exit the bottom of the apparatus 1002. In this exemplarily, a chute is placed at the opening to catch the pellets exiting the apparatus 1002.

Figure 11:
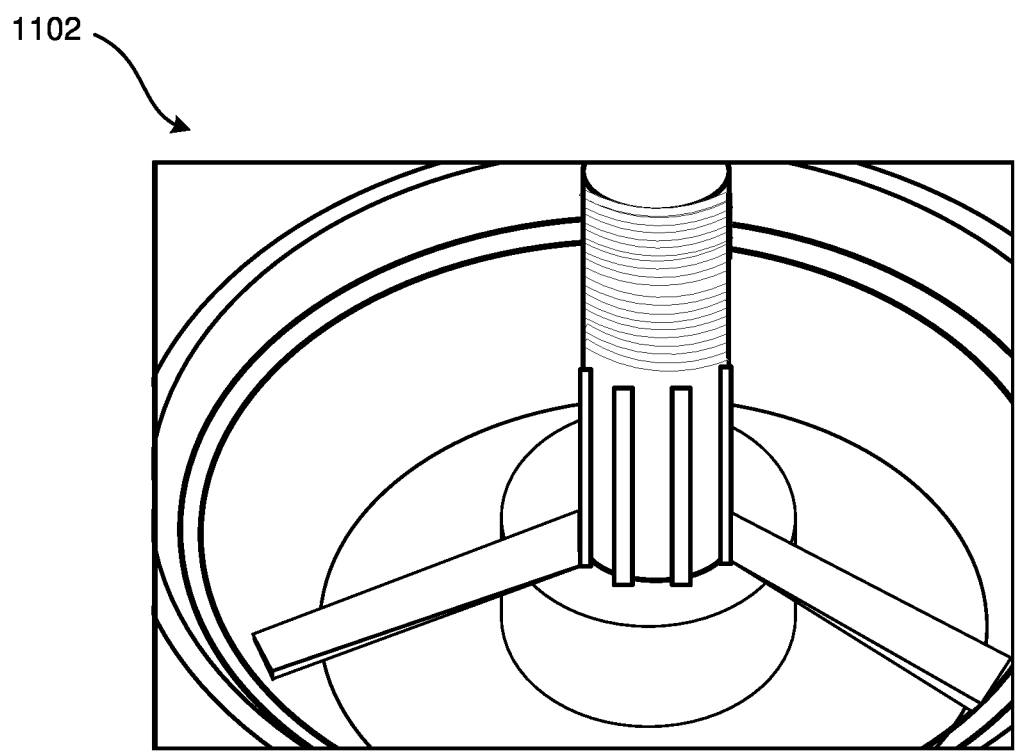
FIG. 11 shows an illustrative view of the internal compartment of the mechanism used to create pellets.

FIG. 11 shows an internal view 1102 of the pelletizing device 1002. In this exemplarily embodiment, three flat arms radiate from the center shaft and cut off each pellet to the desired length and certain height to allow the compressed pellets to drop and exit the device 1002.

Table 1 describes an exemplarily embodiment of a soil additive formula. The formulation described below is added to the coir following processing. As described previously, in contrast to present methods on the market, no additives are introduced to the coir prior to mechanical processing. The present invention only adds the components described below following formation of the coir dust or pellets.

TABLE 1

| Soil Additive Formulation | |
|---|---|
| Coir | Approximately 9 oz. |
| Seed | Approximately 9 oz. |
| Basalt | Approximately 2 oz. |
| Root Stimulant | Approximately 1.25 oz. |
| Lime | Approximately 1 oz. |
| Worm Castings | Approximately 0.5 oz. |
| Fish Meal | Approximately 0.5 oz. |
| Polymer (Starch-Based or Acidic) | Approximately 1.0 oz. |
| Molasses | Approximately 1.0 oz. |

For the formulation above, the percent ranges would be in the ranges as follows:

| | |
|---|---|
| Coir | 30-40% |
| Seed | 30-40% |
| Basalt | 7-8% |
| Root Stimulant | 4-5% |
| Lime | 3-4% |
| Fish Meal | 1-2% |
| Worm Castings | 1-2% |
| Polymer | 3-4% |
| Molasses | 3-4% |

Coir serves as the soil conditioning substrate retaining moisture and the nutrients for the desired plant (seed). Basalt, commonly referred to as volcanic rock contains a wide range of essential natural nutrients and elements helpful to grass and other vegetation. The natural plant root stimulant to supports superior root growth. The natural lime stabilizes pH and provides additional calcium and other growth elements for a plant. The worm castings and fish mill provide natural plant food nutrients. The polymer absorbs and retains moister and nutrients plus enhances beneficial bacteria within the soil. Molasses is high in calcium, magnesium, iron and potassium. It also contains sulfur and a host of micronutrients. Coir is present in the composition to provide for the advantageous ability to absorb and hold water.

In agriculture, soil is an important component to provide the basic substrate for plant growth. Seed is also added to the composition. The exemplary seed in this embodiment is grass seed. However, in alternative embodiments, seed for different types of plants may be used, such as wild flowers, field crop seeds, garden seeds, forest plants, golf course turf seeds, green roof seeds, sanitary leech field grasses, Hazmat and planting applications, erosion control. The composition further comprises basalt, which provides for soil enrichment and many nutrients to assist in plant growth. Another component found in the composition is root stimulant to assist in growing healthy and stable plant root systems. Lime is an additional component and provides for proper pH balance of the composition. Worm castings and fish meal are both rich in nutrients, such as concentrated nitrates, phosphorus, magnesium, potassium and calcium it also contains manganese, copper, zinc, cobalt, borax, iron, carbon and nitrogen for plant growth. Polymers, either starch-based polymers or acidic polymers, are present in the composition to provide for soil stabilization.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of processing coir, comprising:
   providing compressed, dry coir; and
   using counter-rotating blades having central holes to allow the blades to be mounted on one or more shafts to shred the compressed coir into dry, shredded coir, wherein a first type of counter-rotating blades having hooks are mounted on one or more shafts with a second type of counter-rotating blades that do not have hooks.

2. The method as claimed in claim 1, further comprising grinding up the coir after using the counter-rotating blades to produce the dry, shredded coir.

3. The method as claimed in claim 1, wherein using the counter-rotating blades comprises using the first type of blades alternating with the second type of blades mounted along one shaft of the one or more shafts.

4. The method as claimed in claim 3, wherein using the first type of counter-rotating blades comprises using the first type of counter-rotating blades having the hooks of a same size.

5. The method as claimed in claim 3, wherein using the first type of counter rotating blades comprises using the first type of counter-rotating blades having the hooks of different sizes.

6. The method as claimed in claim 1, further comprising screening the dry, shredded coir with a screen to only pass coir of a desired size for further processing.

7. The method as claimed in claim 6, further comprising returning the dry, shredded coir caught in the screen to the counter-rotating blades.

8. The method as claimed in claim 1, wherein the compressed coir comprises one of blocks or wafers.

\* \* \* \* \*